United States Patent [19]

Miller

[11] Patent Number: 4,816,091

[45] Date of Patent: Mar. 28, 1989

[54] METHOD AND APPARATUS FOR PRODUCING REINFORCED CEMENTIOUS PANEL WEBS

[76] Inventor: Robert G. Miller, 7900 Okanagan Ct., Bakersfield, Calif. 93309

[21] Appl. No.: 104,284

[22] Filed: Sep. 24, 1987

[51] Int. Cl.[4] .............................................. B32B 31/12

[52] U.S. Cl. ........................................ 156/42; 156/44; 156/324; 156/549

[58] Field of Search ............................ 156/324, 39–45, 156/269, 549; 118/246

[56] References Cited

U.S. PATENT DOCUMENTS 4,203,788 5/1980 Clear ................................ 156/269 X 4,267,215 5/1981 Riggs ................................ 118/246 X 4,298,413 11/1981 Teare ................................ 156/324 X

*Primary Examiner*—David Simmons

[57] ABSTRACT

A method is described for the continuous production of glass fiber mesh reinforced concrete panels consisting of a layer of light weight concrete core mix bonded to a web of glass fiber mesh on each face. An uncured ribbon of reinforced concrete is first formed, suitable for cutting into individual panels. A new method of depositing the cement slurry or core mix on the web of fiber glass has been developed; this is accomplished by conveying the web over a reversely-turning pumping roller which transfers a controlled amount of slurry or core mix to the web.

12 Claims, 4 Drawing Sheets

METHOD AND APPARATUS FOR PRODUCING REINFORCED CEMENTIOUS PANEL WEBS

BACKGROUND OF THE INVENTION

1. Field of the Invention

This invention relates to the continuous production of fabric reinforced cementitious panel webs suitable for cutting into individual reinforced panels used as backerboards for ceramic tile, and other facing materials. Such reinforced panels are of the type generally described in U.S. Pat. Nos. 3,284,980, 4,159,361 and 4,450,022.

Such panels typically comprise a core layer consisting of a hydraulic cement, such as portland cement, mixed with a light weight aggregate and/or a foaming agent, and a web of reinforcing fabric bonded to each face of the core layer. The panels are described in detail in the Dinkel Pat. No. 3,284,980.

Production of such fabric reinforced panels, and of the fabric reinforced cementitious panel webs from which the panels are cut, is carried out commercially by two similar processes. The first method comprises sequentially laying down on a conveyor belt, carrier means such as a continuous web of plastic coated paper or individual plastic sheets, a web of pervious reinforcing fabric, such as a web of woven glass fiber mesh to which a cementitious slurry has been applied, a layer of cementitious core mix and a second web of pervious reinforcing fabric to which a cementitious slurry has been applied, cutting the uncured ribbon (i.e. panel web) so formed and stacking for curing. In the second method the web of pervious reinforcing fabric without any slurry is laid down on a continuous web of plastic coated paper, a layer of cementitious core mix is then laid on the fabric layer, followed by a second web of bare pervious reinforcing fabric laid down on top of the core, the layers being united as by vibration. In this method the panel web so formed is then cured at least to a hardened condition followed by cutting into individual panels.

Major problems are encountered in the manufacture of such reinforced cementitious panel webs, in the handling and placing of the web of reinforcing fabric on the core layer, and in the application of a proper amount of the cementitious material to the reinforcing web to obtain effective bonding of the web layers to the core layer. In the manufacturing process where only a cementitious core mix is employed (and no slurry is applied to the mesh web) it is difficult to obtain penetration of the core mix through the openings in the mesh to permit good bonding of the mesh to the core.

In the present known methods of manufacture of such panels, the webs of reinforcing fabric, as well as the wet uncured ribbon of cementitious panel material, are drawn through the forming operations under tension. The webs of fabric, as they are drawn into the forming operation, tend to neck-in, due to the tension applied. In the one method the web of fabric is fed into the operation in a width equal to the final width of the panel web being produced. The necking-in reduces the width of the fabric web to less than that of the panel web. The result is that an area along one edge of the panel web, or along both edges, is left devoid of reinforcement; the core material in this area is left with no surface layer. Such edges have little or no integrity and are subject to crumbling or breaking, even where only one of the two reinforcing webs necks-in to less than the panel width.

In order to avoid such defects, in one commercial process the cementitious panel web is made over-size in width and the excess is then trimmed off the edges, usually after the cementitious panel web has hardened sufficiently to facilitate cutting. In this type of process necking-in of the web does not impair the edges of the product but this method adds substantially to the cost of the panels. The fabric reinforcement is, by far, the most expensive component used in production of such cementitious panels and since both edges must be trimmed to produce the final width of panel, a sizeable expense results. There is a double waste since the reinforcing fabric is over-size both on the top and the bottom. In addition, there is the waste of core material cut off and the labor cost of carrying out the trimming operation, as well as the cost of disposal of the trimmings.

The tension applied to the uncured panel web in order to tow it or draw it along the forming line tends to cause the top layer of reinforcing fabric to slip back whenever the conveyor belt is stopped and re-started. This is particularly likely to occur where the panel web is cut immediately after it is formed and before curing. In one of the conventional production methods the conveyor belt is stopped momentarily as a panel length is cut and the belt is then re-started. As the conveyor belt again moves forward the top layer of reinforcing fabric tends to pull back from the cut end; this is due to the pull on the fabric acting counter to the tension.

Displacement of the web, particularly the top web, as by pulling in from the edges, occurs even when the individual panels are severed by a flying cutter and the flow of the panel web is not interrupted. The tension applied is not always uniform as the ribbon (panel web) is towed along through the production line, and the reinforcing fabric is readily displaced because of the wet slurry that the fabric rides in.

Another serious problem in prior methods is that they are lacking in means for compensating for differences in the viscosity of the slurry, and also of the core material, during running of the forming machine. This problem is most evident where a layer of fabric bathed with slurry is deposited on top of the core layer. The amount of slurry that can be picked up by a given mesh web drawn through a slurry bath is a function of the viscosity of the slurry. Where the slurry viscosity is low only a limited amount of slurry is carried by the mesh, with the result that the web of mesh is only lightly bonded to the core. This is particularly true in the case of the layer of mesh that is laid on top of the core; the slurry carried on the mesh tends to flow by gravity into the core, thereby starving the mesh. The result is a serious defect of inadequately bonded mesh and potential delamination. Where the viscosity of the slurry is too high the web of mesh will pick up an excess of slurry as it passes through a bath. The result will be a thick, hard surface on the cured panel increasing the weight of the panel undesirably and impairing the nailability of the panel.

The third major problem is that of securing penetration of the core mix through the openings of the reinforcing fabric when bare fabric (with no cementitious slurry applied) is employed. The single composition core mix employed is highly viscous and penetrates the openings in the mesh only with difficulty. Galer, in U.S. Pat. No. 4,450,022, points out that inadequate penetration of the openings in the reinforcing mesh is common to all methods of production of mesh reinforced cementitious panels. In order to overcome this problem it has been necessary to use a mesh with larger openings and a lower yarn count per inch, such as 8×8 or 10×10, resulting in a panel of lower flexural strength. Another expedient offered to improve penetration of the bottom mesh is that of a step-down in the conveyor table which allows the mesh with core to be displaced from the carrier sheet. This requires added equipment and still requires the mesh with large openings.

The term "cementitious" as used herein refers to any composition containing a hydraulic cement such as portland cement. The term "slurry" refers to a flowable mixture of water and a hydraulic cement. The term "cementitious core mix" (and alternately "core mix") refers to a mixture of a hydraulic cement, water and aggregate such as sand, expanded shale or clay, expanded polystyrene beads, slag and similar materials, as well as foaming agents, modifiers and the like. The term "pervious reinforcing fabric" (and alternatively "fabric") refers to a layer or mat of fibers suitable for use in concrete, having openings sufficiently large to permit penetration of the cementitious slurry or core mix into and through the openings so as to permit adequate bonding of the fabric to the core; the most commonly used such fabric is a woven heat-set mesh of vinyl coated glass fiber yarns. The term "cementitious composition" as used herein refers collectively to cementitious slurries and cementitious core mixes.

2. Description of the Prior Art

In U.S. Pat. No. 3,284,980 (Dinkel) a cementitious panel having a core of lightweight aggregate and portland cement with a layer of a woven mesh of glass fiber yarns bonded to each of the two major faces by means of a relatively high density layer of hydraulic cement, is described. The panels are shown as being formed in molds, with the slurry of hydraulic cement (portland cement) being applied to the layer of glass fiber mesh in the mold by means of a traveling supply pipe. The slurry penetrates the openings in the fabric and fills them so that the fabric layer is enveloped on both sides with the slurry. The patent is not concerned with a continuous production process nor with tension on the fabric.

U.S. Pat. No. 3,509,010 (Metzger) describes a method of producing a cementitious building panel by impregnating a strip of covering material (e.g. glass fiber sheet) with a hydraulic cement slurry, depositing a layer of expanded clay particles and hydraulic cement on the cover material to form a composite continuous strip, hardening the continuous strip and then cutting the continuous strips into panels (building components). This patent is silent as to how the glass fiber sheet is impregnated with the hydraulic cement slurry.

U.S. Pat. No. 4,159,361 (Schupack) describes a flexible reinforced cementitious panel which is cold deformable, suitable for bending to form drums, culverts, pipes and the like. Production of the panels is shown as being carried out by moving a train back and forth across a forming table whereby individual panels are formed one on top of the other. The train lays down a length of reinforcing fabric such as coated fiberglass, then a layer of cementitious composition which is smoothed by an oscillating screed and then lays down a second layer of fabric. The entire assembly is vibrated to encapsulate the reinforcing fabrics in the cementitious composition.

U.S. Pat. No. 4,203,788 (Clear) describes a method and apparatus for producing the Dinkel cementitious panel. In the described process the web of reinforcing fabric, namely fiberglass mesh, is impregnated with a cementitious slurry by drawing it through a bath of the slurry to fill the voids in the mesh and to accumulate slurry on both sides of the mesh. In the next step the excess slurry is doctored off the mesh, followed by a dragging step.

The mesh is then laid on carrier sheets, a layer of cementitious core composition is deposited on the mesh and a second layer of slurry impregnated mesh is laid upon the core. A panel web is thereby formed which is then cut into panel lengths. This process has a serious disadvantage in that the webs of reinforcing fabric are under tension until after the cutting step; necking-in of the fabric and defective panel edges frequently occur. Also, this process is seriously deficient in another respect. While suitable for securing bonding of the bottom layer of mesh to the core, it does not permit controlled bonding of the top layer of mesh to the core in that it does not have the means for adjusting operations to compensate for variations in the viscosity of the cementitious slurry. The amount of slurry picked up by the mesh as it is drawn through the slurry bath is entirely dependent upon the slurry viscosity.

In U.S. Pat. No. 4,298,413 (Teare) the cementitious slurry is applied to the glass fiver mesh by a series of transfer rollers. This method is limited in that the transfer of the desired thickness of slurry film from one roller to another is difficult to achieve with a portland cement slurry; the film thickness varies excessively.

In U.S. Pat. No. 4,450,022 Galer describes a method of producing fabric reinforced cementitious panels in which no slurry or other bonding agent is separately applied to the web of reinforcing mesh. Instead, a first web of mesh is laid on a web of carrier paper supported on a conveyor belt, an aqueous cementitious mixture is discharged onto, and spread across, the mesh to a desired thickness, and a second web of mesh is laid on top of the layer of cementitious mix and pushed into the mix by a screed projecting just below the surface, combined with a vibration action. This process has the disadvantage of inadequate penetration of the mesh openings by the core mix unless a large opening mesh is employed as well as vibration and a conveyor belt step off.

In U.S. Pat. No. 4,477,300 (Pilgrim) a cementitious board is formed by depositing a heavy slurry of gypsum plaster between two webs of paper board or glass fiber tissue and pressing the two webs toward each other to achieve the desired thickness. Vibration is applied to the webs to cause unwanted air bubbles trapped in the slurry to be removed.

U.S. Pat. No. 4,504,335 (Galer) describes a method of producing fabric reinforced cementitious panels which is similar to that described in U.S. Pat. Nos. 4,488,917 and 4,450,022. In U.S. Pat. No. 4,504,335 the top web of fabric is pressed into the layer of core material and the final thickness of the core layer (mortar) is regulated by a reversely turning roller instead of by a screed blade or trowel. This process requires the use of tension in that the reinforcing fabric (network) must be dragged through the slit between the roller and supporting surface (conveyor belt).

SUMMARY OF THE INVENTION

I have discovered that the manufacture of cementitious panels by a continuous process can be carried out without applying tension to the webs of reinforcing fabric at the panel forming stage and as a result the problems arising from the use of tension to a web are eliminated. Also, I have discovered a much simplified apparatus for carrying out the process.

I have found that by feeding the fabric web over a reversely turning pumping roller partially immersed in a cementitious slurry or in a core mix the slurry or core mix can be pumped through the fabric, completely filling the openings in the web and coating the upper and lower faces of the web with a layer of the slurry or core mix. The fabric web, laden with the cementitious composition as it leaves the pumping roller area, drapes downward and is laid either (1) on the carrier, such as a paper web or a plastic carrier sheet or (2) on to the layer of core mix or on to the layer of cementitious composition that has been deposited on the bottom layer of the fabric. The slack in the fabric web as it drapes down insures that there is no necking-in of the fabric and no pull back of the fabric as the conveyor belt moves forward or as it is restarted.

Reinforcing meshes having relatively small openings such as meshes with a 12×20 or 16×18 count per inch can be used and thorough penetration of the fabric with the cementitious composition secured with my process.

With my process a substantial range in the weight of the cementitious composition applied to the fabric web can be obtained. The amount applied can be only that needed to bond the fabric web to the bottom or to the top of the core mix layer as the case may be. At the upper end of the range sufficient composition can be pumped through the openings in a glass fiber woven mesh, with a heavy consistency composition, to build a layer on the top side of the first web of mesh equal to or approaching the desired thickness of the panels being produced. Slurry or core mix can be applied to the second web of fabric in greater or lesser amount as needed to complete the thickness of the panel web being formed and to bond to the layer of cementitious composition carried on the first web.

This method greatly simplifies the methods now in use or described in the prior art. The pumping roller deposits a substantially uniform thickness of slurry, core mix or the like across the width of the fabric. Consequently screeding of the slurry layer or core mix layer is unnecessary.

In my process the amount of cementitious composition deposited on the fabric web is regulated by adjusting the viscosity of the composition, the diameter of the reversely turning pumping roller, its speed of rotation, and the length of the arc of contact of the fabric web with the surface of the pumping roller. These several factors are correlated depending upon the desired results.

A slurry having a viscosity similar to a thick cream is used where slurry is being deposited as a light coating on the fabric web, top and bottom, to bond the fabric web to a core mix layer. Where a cementitious composition is being applied to the web in sufficient amount to contribute to or to constitute the entire thickness of the core layer, a high viscosity composition is employed.

The pumping roller can be of a diameter of only a few inches for light applications of slurry to a fabric web as where the web is to be bonded to the face of a separately deposited core mix layer. Where the cementitious composition is to be applied in sufficient quantity to constitute a part or all of the core layer the diameter of the pumping roller typically is 12 inches or more.

The speed of rotation of the pumping roller is adjusted in relationship to the viscosity of the cementitious composition, the speed of travel of the fabric web and the amount of the composition to be applied to the web. In effect, the pumping roller serves to pump the slurry or core mix through the openings in the fabric and deposit the material on the top of the fabric web in greater or lesser amount as desired, filling the openings and coating the bottom face as well. A variable speed drive is employed to rotate the pumping roller. The speed of rotation of the roller, for example, will be only a few rpm for the application of a thin layer of slurry sufficient to bond the reinforcing web to a core mix layer. This pumping action, readily adjustable through the variable speed drive and the extent of contact of the web with the pumping roller, provides wide latitude and control in the application of the slurry or core mix. For example, if the slurry furnished to the slurry reservoir is somewhat thinner than the previous batch the pumping roller can be speeded up to maintain the amount of slurry deposited at the desired level. This degree of control is not present in other known continuous methods of producing fabric reinforced cementitious panels. For example, in the clear process where the fabric web must be drawn through the slurry bath, the amount of slurry that can be deposited on the web is limited to the amount of slurry that the web can drag out of the bath. If the slurry is thin then the amount of slurry carried on the web as it leaves the bath will be inadequate for bonding of the web to the core. In-process adjustment to correct this deficiency is not possible.

An object of this invention is to provide an improved, simplified method for the continuous production of fabric reinforced cementitious panels.

A further object of this invention is to provide adjustable means for applying cementitious compositions to a web of reinforcing fabric.

A further object of this invention is to provide a non-tensioned method of applying cementitious composition to a web of reinforcing fabric in the production of fabric reinforced cementitious panels.

Another object of this invention is to provide a method of applying cementitious composition to a web of reinforceing fabric in substantial but controlled amount.

Another object of the invention is to provide a method of applying a cementitious composition to a web of non-heatset woven reinforcing fabric.

DETAILED DESCRIPTION OF THE INVENTION

Figure 1:
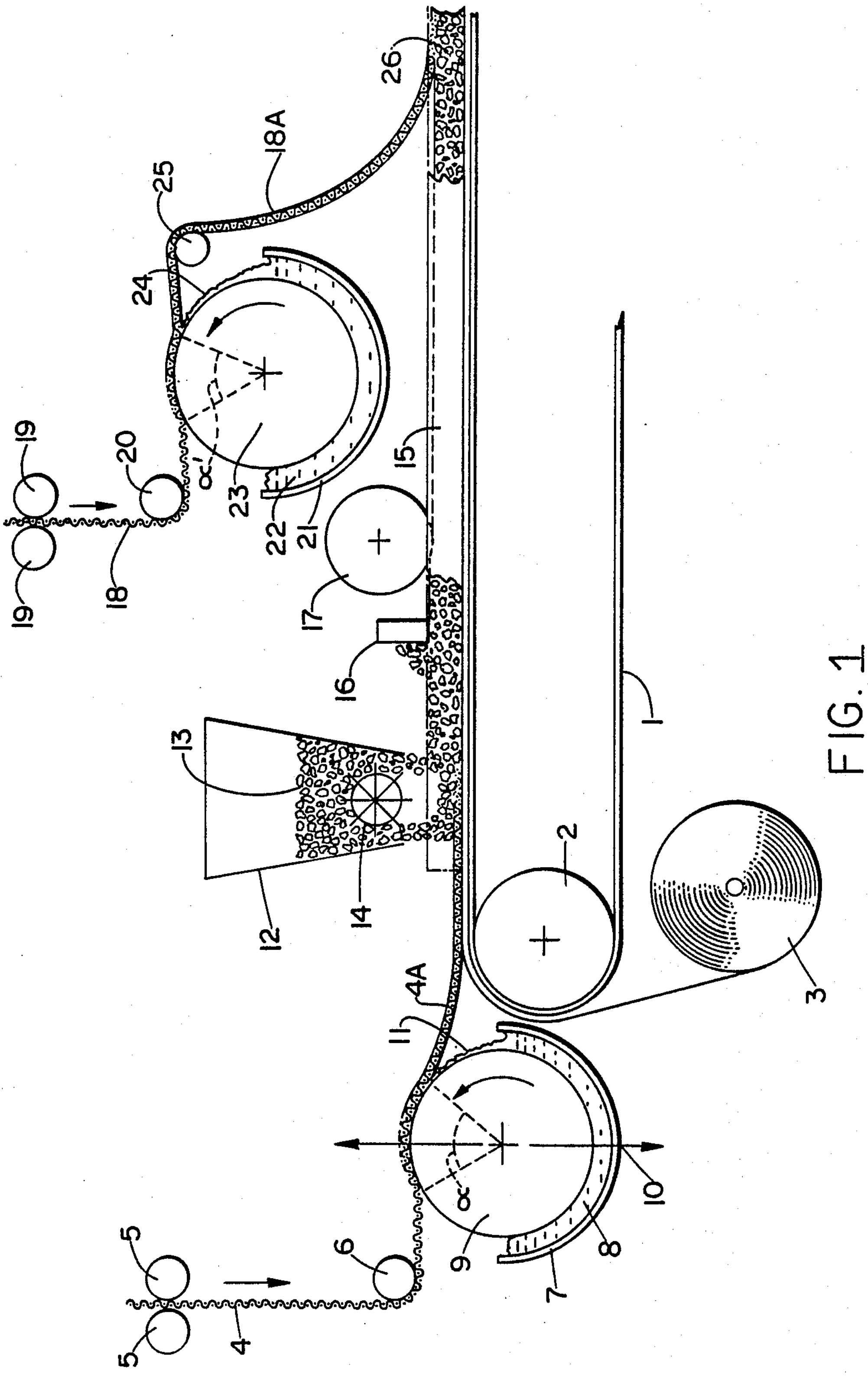
FIG. 1 is a schematic front elevation view of the apparatus of the invention.

FIG. 1 illustrates one embodiment of my method of continuous production of a cementitious panel web suitable for cutting into individual panels of desired length. A continuous length of carrier paper 3 is laid on a moving conveyor belt 1 extending between roller 2 and a second roller. The reinforcing fabric web, in this case a woven glass fiber mesh 4, is fed between a pair of pinch rollers 5, under dancer roll 6, to the slurry applicator apparatus consisting of a variable speed reversely turning pumping roller 9 partially immersed in a reservoir 7 of slurry 8, and means, not shown, but indicated at 10, for vertically adjusting position of reservoir 7 and roller 9 as a unit. As the surface of roller 9 emerges from the slurry in the reservoir 7 it carries a layer 11 of the slurry which is then pushed into and through the openings in the mesh 4 by the pumping roller. The slurry impregnated mesh 4A then drapes downward due to the weight of the slurry and is laid on the carrier paper 3 under a non-tensioned condition. The carrier paper web together with mesh web 4A is moved by conveyor belt 1 under hopper 12 where core mix 13 is discharged on to the mesh web 4A by known means such as a rotating device 14. The core mix is then spread into a uniform layer as it passes under a screed device 16 and compaction roller 17 and between side rails 15. A second web of fabric 18, preferably a web of woven glass fiber mesh, is fed over the variable speed reversely turning roller 23. The slurry 22 picked up by a roller 23 as layer 24 is pushed through the openings in mesh 18 to impregnate and deposit the desired amount thereof on the upper and lower faces of the mesh. The slurry impregnated mesh 18A, as it leaves guide bar 25, drapes downward and is laid under non-tensioned condition on the core mix layer. A blade, roller or other means can be used, if necessary, to press the mesh 18A into contact with the core mix layer. The resulting panel web, that is, the elongated uncured ribbon of fabricreinforced cementitious material 26 can be cut into individual panels and stacked for curing or can be transported on an elongated conveyor belt through a curing operation until hardened and subsequently cut into individual panels.

The amount of slurry 8 deposited on the mesh 4 is controlled by regulating the arc of contact $\alpha$, as well as by the speed of rotation of roller 9 and consistency of slurry 8. The arc of contact for the first web is controlled by vertically adjusting the reservoir 7 and roller 9 as a unit. Dancer roll 6 is independently mounted and optionally is vertically adjustable for additional control of the arc of contact. At the second slurry application station in FIG. 1, dancer roll 20 and guide bar 25 are independently mounted and vertically adjustable. The arc of contact $\alpha^1$ is controlled by the vertical adjustment of dancer roll 20 or of guide bar 25 or of both.

In this embodiment of my invention slurry 8, also slurry 23, typically is a mixture of portland cement and water, with or without the addition of fine aggregate, and is of pumpable consistency, similar to that of heavy cream. The core mix 14 typically is a mixture of portland cement, water and lightweight aggregate such as expanded clay, expanded shale, perlite, expanded plastic beads, and the like. It is usually a fairly dry, stiff mix with only sufficient water for good blending of the components and curing of the portland cement. The carrier laid on the conveyor belt can be polyethylene coated kraft paper web such as described in Galer or Teare or can be reusable plastic sheets the size of the individual panels as described in Clear.

The point of lift off of the fabric from the pumping roller is important. It is critical that the mesh be lifted off of the pumping roller at a point where the slurry (or core mix) is still being applied to the mesh. By the very nature of the process splitting of the layer of slurry or core mix will occur when the mesh leaves the surface of the pumping roller. For proper operation of the process the splitting must take place when the layer is of sufficient thickness that it will split readily leaving the desired layer of slurry on the mesh. Should the mesh remain in contact with the pumping roller beyond the point where there is a bead of slurry or core mix between the mesh and roller and then the mesh is lifted off the roller, the split will occur at the lower face of the mesh rather than in the layer of slurry or core mix and the pumping roller will pull the slurry or core mix from the mesh openings.

Figure 3:
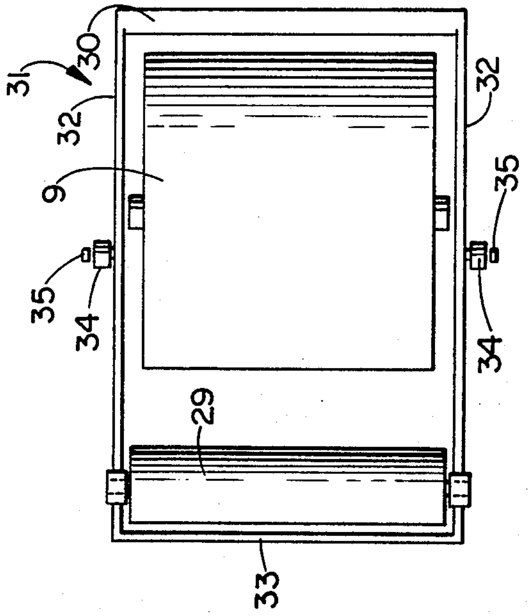
FIG. 3 is a sectional top view of the frame member of the apparatus shown in FIG. 2, taken along line 2—2 thereof.
Figure 2:
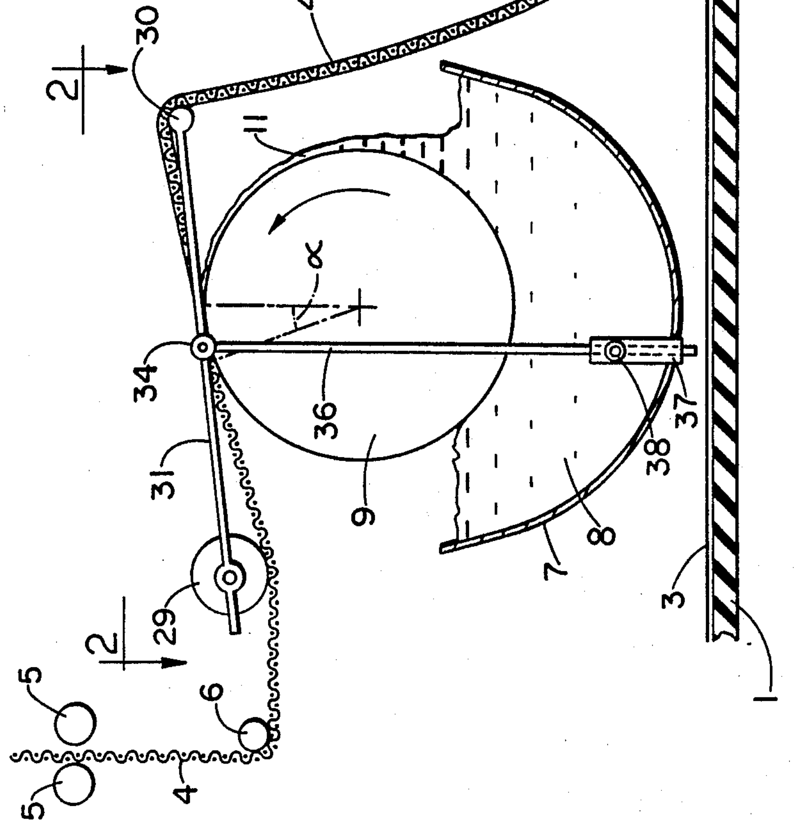
FIG. 2 is a front sectional view of a modification of the apparatus for applying cementitious compositions to a web of reinforcing fabric according to the present invention.

FIGS. 2 and 3 illustrate a modification of the apparatus of my invention with reference to a woven glass fiber mesh as the reinforcing fabric, and with application of a cementitious slurry 8. The mesh 4, properly positioned transversely by an edge guidance system acting through a pair of pinch rollers 5 and dancer roll 6, passes under guide roll 29, and on to the surface of pumping roller 9. The reversely turning roller 9 picks up a layer 11 of the slurry 8 from the reservoir 7 and transfers it to the mesh 4, pumping the slurry through the openings in the mesh and depositing the desired amount of slurry on the upper face of the mesh as well as filling the openings and coating the lower face. The mesh is then lifted off of the roller 9 by means of non-rotating guide bar 30, splitting the layer of slurry 11. The bar 30 also serves to direct the slurry-laden mesh web 4A away from the reservoir 7 and to guide the downward drape of the web on to the carrier, or on to the previously deposited layer of cementitious material, being transported by the conveyor belt 1.

Guides 29 and 30 are mounted on a frame 31 which in turn is pivotably supported on two adjustable rods 36. As shown in FIG. 3, frame 30 consists of two side members 32, stationary guide bar 11, cross member 33, an pivot 34 on each of the side members 32 with threaded knob 35 on each side to permit adjusting and locking the frame in the desired position. Guide roll 29 is freely rotatable; guide bar 30 is not.

Guides 29 and 30 provide the means for regulating the point of contact of the mesh with the pumping roller 9, the length of the arc of contact of the mesh with the surface of the pumping roller 9 as indicated by angle $\alpha$, and the point at which the mesh is lifted off of the pumping roller. Each of the two supporting rods 36 is adjustably mounted in a bracket 37 and can be locked in place by clamping knob 38. Thus, the position of the frame 31 and the two guide members 29 and 30 can be adjusted vertically; in addition the frame 31 can be tilted, that is, pivoted about pivot members 34. Lowering of frame 31 thus would increase the length of the arc of contact of the mesh with pumping roller 9 and would increase the amount of slurry or core mix pumped through, and deposited on, the mesh.

The tilt of the frame 31 controls the point of lift off of the mesh from the surface of pumping roller 9. Thus, if the frame is tilted so that guide bar 11 is dropped to a lower position the point of lift off would be later, in the sense that the mesh would have been removed from contact with the surface of roller 9 at a point closer to the level of the slurry or core mix in the reservoir.

Guide bar 30 also serves to direct the slurry-laden or core mix-laden mesh away from reservoir 7, guiding the downward drape of the mesh on to the layer on belt 1.

Vertical adjustment of frame 31 permits the arc of contact of the mesh with roller 9 to be changed as required to secure the desired result. For example, where a core mix is being pumped through the mesh to build up a heavy layer on the upper face, a greater arc of contact will be needed than when a thin layer of slurry is being deposited.

Figure 4:
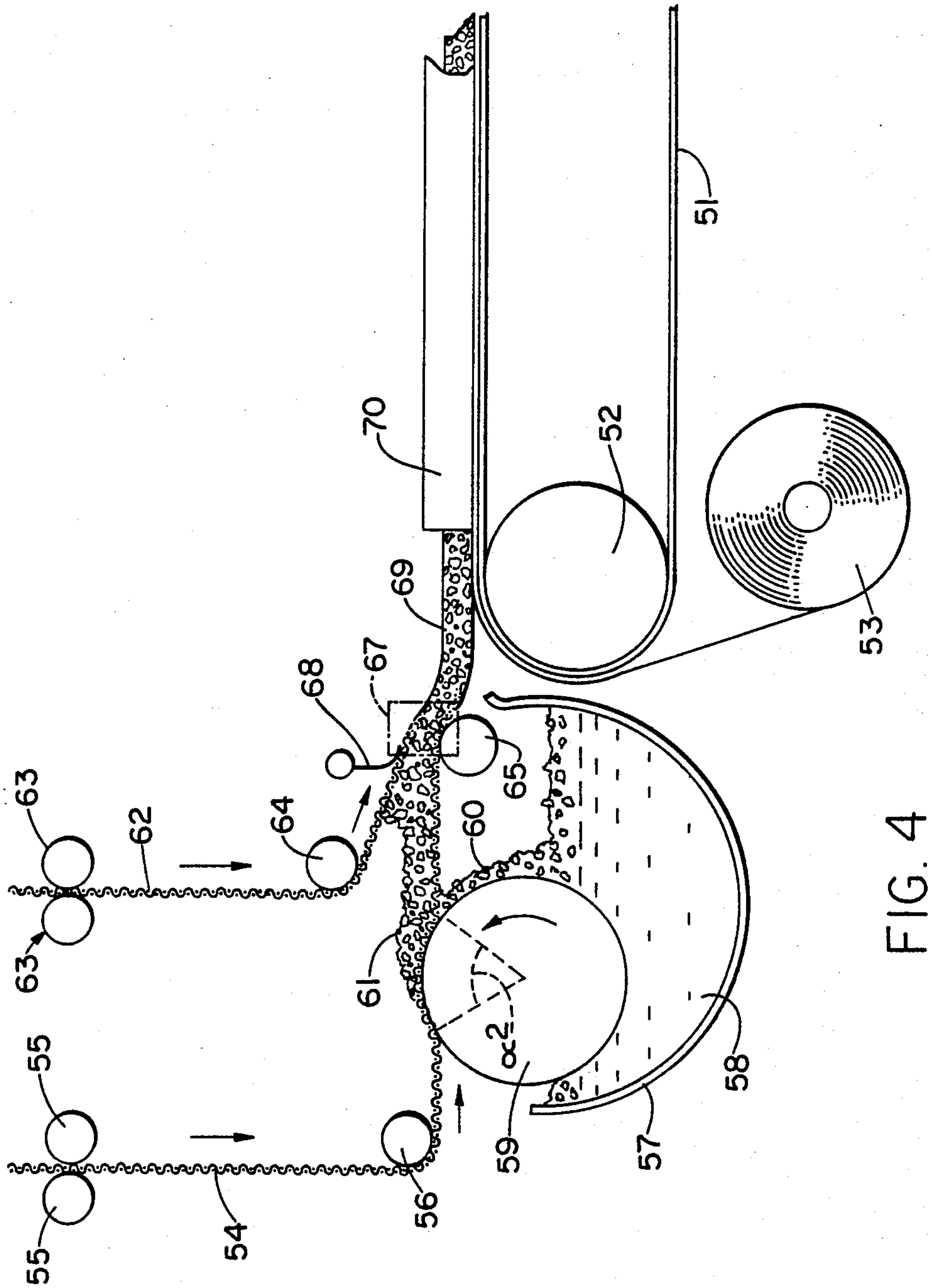
FIG. 4 is a schematic front elevation view of the apparatus for applying heavy layers of cementitious compositions to a web of reinforcing fabric according to the present invention.

FIG. 4 illustrates the second embodiment of my invention. In this embodiment the need for separate means to dispense a core mix or like material, used as the center layer, is eliminated. I have found that a cementitious core mix (or slurry) of heavy consistency can be pumped into and through the web of reinforcing fabric to leave on the upper face of the web 54 a layer 61 of core mix of a thickness sufficient to build a fabric-reinforced cementitious panel web. The core mix 58 typically is a mixture consisting of portland cement, water and aggregate as well as other ingredients such as a foaming agent, as required for the panel web being produced. The reinforcing fabric in this example is woven glass fiber mesh, such as a mesh with an 8×8, or a 10×10 yarn count per inch, so as to provide openings of a size to permit passage of the aggregate particles through the mesh.

The thick layer of cementitious composition 61 pumped through to the upper face of the web 54 is obtained by the use of a cementitious composition of heavy consistency, a pumping roller 59 of larger diameter, for example 10 to 14 inches, a faster speed of rotation of the roller 59 and a longer arc of contact of the mesh. The arc of contact of the mesh 54 with roller 59, indicated by the angle $\alpha^2$ is regulated by the vertical position of the various components. Reservoir 57 together with pumping roller 59 are adjustable vertically as a unit. Guide roll 56 is mounted for independent adjustment in the vertical direction as is also guide bar 65. Thus the desired arc of contact of the mesh is obtained by vertically adjusting one or more of the foregoing components. The layer 60 of cementitious composition picked up by pumping roller 59 is pumped through the mesh web 54 to accumulate an excess of the cementitious composition on its upper face by regulating the arc of contact, speed of rotation of pumping roller 59 and viscosity of the cementitious composition 58.

The formation of the panel web 69 occurs at the point where the web of mesh 54 with its layer of cementitious composition 61 is brought together with a second web of mesh 62 under an adjustable blade or screed 68 which is adjustably spaced from guide bar 65 to provide the panel web 69 of desired thickness. Mesh web 62 is embedded in the surface of the layer 61 by the pressing action of the blade or screed 68. End dams 67, one on each side of the web, serve to form the edges of the panel web. Excess cementitious composition is held back by the screed 68 and, in back of end dams 67, it drops off of the edges of the web of mesh to be returned to the reservoir 57. The thus-formed panel web 69 then drapes down on to the paper web carrier 53 under non-tensioned condition and is conveyed on conveyor belt 51 between side rails 70 to the next operation, be it curing, cutting or other.

Figure 5:
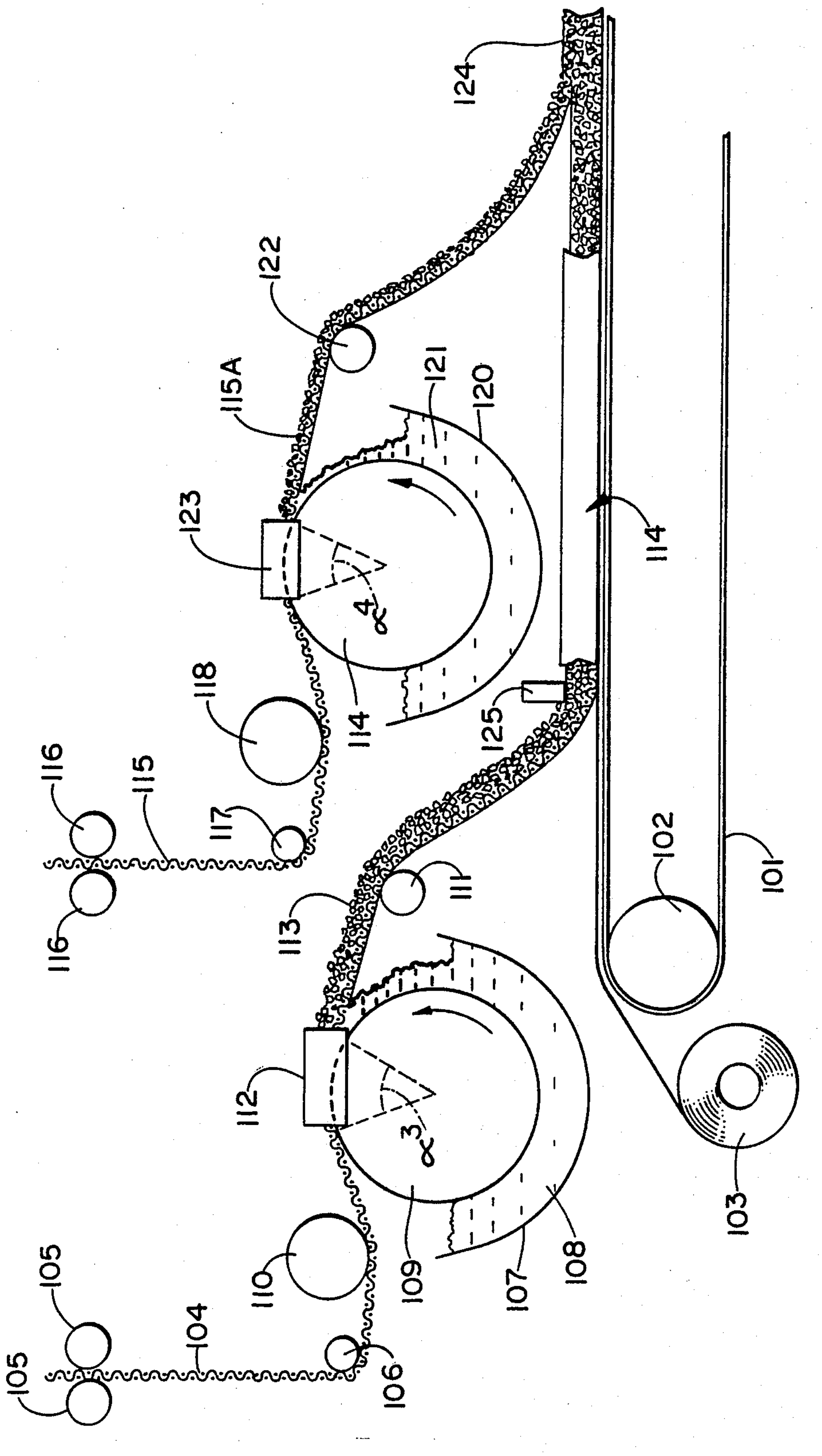
FIG. 5 is a sectional elevation view of a modification of the apparatus shown in FIG. 4.

FIG. 5 illustrates another version of the second embodiment of my invention wherein the need for separate means to dispense a core mix or like material used as the center layer, is eliminated. FIG. 5 illustrates the apparatus modified to produce a panel web by building up the layer of cementitious composition in two steps.

Mesh web 104 fed between pinch rolls 105 and under dancer roll 106 passes over reversely turning pumping roller 109 partially immersed in cementitious composition 108 held in reservoir 107. A relatively heavy deposit 113 of composition 108 is pumped through the mesh openings on to the upper surface of the mesh web 105 by employing a suitable arc of contact $\alpha^3$, suitable diameter roller and speed of rotation and proper composition. The arc of contact is regulated by adjusting the vertical position of guide roll 110 and guide bar 111; these two guides can be independently mounted or can be mounted in a frame as in FIGS. 2 and 3.

The web of mesh 104 impregnated with core mix 108 and carrying on its upper face layer 113, is deposited on the carrier 103 under non-tensioned conditions. Sufficient drape is provided so that no tension on mesh 104 develops due to movement of the conveyor belt 101. End dams 112 are provided, one on each side, to confine the core mix.

Side rails 114 are placed along the sides of the conveyor belt 101 at the desired panel width spacing, to confine and shape the edges of the layer of core mix 113 carried on web 104. A screed 125 may be used as needed to insure a uniform layer of core mix.

A second web of mesh 115 is fed under dancer roll 117 and guide roll 118, and over reversely turning pumping roller 119. Core mix (or slurry) 121 held in reservoir 120 is pumped into the mesh 115 to impregnate it with the core mix or slurry; it can be the same cementitious composition as that in reservoir 107 or it can be a different cementitious composition. The amount of core mix or slurry 121 deposited on mesh 115 can be varied; it can be sufficient to augment layer 113 and thereby add to and complete the thickness of the panel web being produced or it can be only that needed to bond the mesh web 115 to layer 113. In the latter case the arc of contact, the speed of rotation of pumping roller 119 or the viscosity of the cementitious composition is reduced; or any combination of these factors can be adjusted. The impregnated mesh web 115A is deposited on layer 113 to complete the panel web 124 and with sufficient drape that no tension on web 115A develops due to movement of the conveyor belt 101.

The direction of rotation of the pumping roller is important. If the pumping roller is rotated in the same direction as the movement of the web, the roller surface removes the cementitious composition from the web and its openings, depleting the composition coverage of the web. When the pumping roller is rotated in the reverse direction to the travel of the web it acts as a pump, forcing the cementitious composition through the openings in the fabric web and depositing more or less of the composition on the upper face of the web in controlled amount.

The arc of contact of the fabric web with the surface of the pumping roller will be as little as a few degrees, only a kiss, where the amount of slurry being applied to the web is that needed merely to bond the web to a separately deposited core layer. This is sufficient to lightly coat both the upper and lower faces of the web and fill its openings with the slurry. The arc of contact is increased as heavier weights of cementitious composition are to be applied.

My invention makes it possible to produce several different fabric reinforced cementitious panels with the same apparatus and furthermore to do so with much simpler means than has heretofore been known while at the same time providing in-process control of the manufacturing operations. For example, the Dinkel panel (U.S. Pat. No. 3,284,980), the Schupack panel (U.S. Pat. No. 4,159,361) and the single composition panel of Galer (U.S. Pat. No. 4,450,022) can all be produced with our apparatus. With my invention the same basic apparatus can apply a thin layer of slurry to the fabric web sufficient to bond the web to a separately applied layer of core mix, or it can pump a core mix through a mesh having suitable size openings, in sufficient quantity to build a panel web of a desired thickness. The several controllable factors, namely, diameter and speed of rotation of the pumping roller, the arc of contact of the fabric web with the surface of the pumping roller and the viscosity of the cementitious compositions, provide an advantageous versatility not found in other methods or apparatuses.

While but two embodiments of my novel process and two version of the pumping roller apparatus have been described and shown in the figures, it will be understood that the method and apparatus of the invention may be modified in other ways within the scope and spirit of the claims.

What I claim is:

1. In the continuous production of fabric reinforced cementitious panel webs suitable for cutting into panel lengths in which a first web of previous reinforcing fabric, a layer of cementitious core composition and second web of pervious reinforcing fabric are deposited on a moving conveyor belt to form an uncured ribbon of fabric reinforced cementitious composition, the improvement which comprises passing at least one of said webs over a reversely turning pumping roller partially immersed in a flowable cementitious composition thereby filling the openings in, and coating the upper and lower faces of, said web with said flowable cementitious composition, and transferring said web in a non-tensioned condition by means of a draping action onto said conveyor belt or a said first web of previous reinforcing fabric.

2. The method as claimed in claim 1 wherein the amount of said cementitious composition deposited on said web is controlled by regulating one or more of the following variables; (1) the consistency of said composition, (2) the diameter of said pumping roller, (3) the speed of rotation of said pumping roller and (4) the arc of contact of said web with said pumping roller.

3. In the continuous production of fabric reinforced cementitious panel webs suitable for cutting into panel lengths the method which comprises, passing a first web of pervious reinforcing fabric over a reversely turning pumping roller partially immersed in a reservoir of cementitious slurry thereby pumping said slurry through the openings of said web, depositing said first web in a non-tensioned condition by means of a draping action onto a moving conveyor belt, depositing on said first web a layer of core mix, passing a second web of pervious reinforcing fabric over a reversely turning pumping roller partially immersed in a reservoir of cementitious slurry whereby said slurry is pumped through the openings of said web, and depositing said second web in a non-tensioned condition by means of a draping action onto said layer of core mix in bonding contact thereby forming an uncured fabric reinforced panel web.

4. The method as claimed in claim 3 wherein as to each of said webs the viscosity of said slurry, the diameter of said pumping roller, the speed of rotation of said pumping roller and the arc of contact of said web with said pumping roller are regulated as needed to control the amount of slurry deposited on said web.

5. In the continuous production of fabric reinforced cementitious panel webs suitable for cutting into panel lengths the method which comprises, passing a first web of pervious reinforcing fabric over a reversely turning pumping roller partially immersed in a reservoir of flowable cementitious composition whereby said cementitious composition is pumped through the openings of said first web to deposit a layer of said cementitious composition on the upper face of said web, depositing said first web in a non-tensioned condition by means of a draping action onto a moving conveyor belt, and depositing a second web of pervious reinforcing fabric in a non-tensioned condition by means of a damping action on the cementitious composition layer in bonding contact to form an uncured fabric reinforced panel web.

6. The method as claimed in claim 5 wherein the said second web is passed over a reversely turning pumping roller partially immersed in a reservoir of a flowable cementitious composition whereby said cementitious composition is pumped through the openings of said web to deposit a layer of said cementitious composition on said second web.

7. The method as claimed in claim 5 wherein the viscosity of said cementitious composition, the diameter and the speed of rotation of said pumping roller and the arc of contact of said first web with said pumping roller are regulated as needed to control the amount of cementitious composition deposited on said first web.

8. The method as claimed in claim 6 wherein the viscosity of said cementitious composition, the diameter and the speed of rotation of said pumping roller and the arc of contact of said second web with said pumping roller are each regulated to control the amount of said cementitious composition deposited on said second web.

9. Apparatus for the application of cementitious composition to a web of pervious reinforcing fabric in the continuous production of fabric reinforced cementitious panel webs comprising a conveyor belt on which said panel webs are deposited, a reservoir containing a cementitious composition, a reversely turning pumping roller partially immersed in said cementitious composition, variable speed means for driving said pumping roller, means for feeding a web of pervious reinforcing fabric into contact with the upper surface of said pumping roller, means for vertically adjusting the position of said pumping roller and said reservoir as a unit to regulate the arc of contact of said web of reinforcing fabric with said pumping roller and to regulate the transfer of said web of reinforcing fabric in a non-tensioned condition to said conveyor belt.

10. Apparatus for the production of fabric reinforced cementitious panel webs suitable for cutting into panel lengths which comprises;

a conveyor belt on which said panel webs are deposited a reservoir containing a cementitious composition, a reversely turning pumping roller partially immersed in said cementitious composition, means for driving said pumping roller, means for feeding a first web of pervious reinforcing fabric toward said pumping roller, a first guide means for guiding said first web into contact with a layer of said cementitious composition carried on the surface of said pumping roller, a second guide means forward of said pumping roller to receive said first web as it leaves the surface of said pumping roller laden with said cementitious composition, means for feeding a second web of pervious reinforcing fabric into bonding contact with said cementitious composition carried on said first web, thickness control means adjustably spaced from and cooperating with said second guide means to thereby form a panel web, and means for transferring said panel web to said conveyor belt under non-tensioned conditions.

11. Apparatus according to claim 10 in which said first guide means and/or said reservoir and said pumping roller as a unit are vertically adjustable to regulate the arc of contact of said first web with the surface of said pumping roller.

12. Apparatus for the production of fabric reinforced cementitious panel webs suitable for cutting into panel lengths which comprises;

a conveyor belt on which said panel webs are deposited, a first reservoir containing a cementitious composition, a first reversely turning pumping roller partially immersed in said cementitious composition, means for feeding a first web of pervious reinforcing fabric into contact with a layer of said cementitious composition carried on the surface of said first pumping roller, means for vertically adjusting said first reservoir and said first pumping roller as a unit to regulate the arc of contact of said first web with the surface of said first pumping roller, and to transfer said first web onto said conveyor belt in a non-tensioned conditon by a draping action, means for depositing core mix on said first web, means for forming said core mix into a uniform layer, a second reservoir containing a cementitious composition, a second reversely turning pumping roller partially immersed therein in said cementitious composition, means for feeding a second web of pervious reinforcing fabric into contact with a layer of said cementitious composition carried on the surface of said second pumping roller, and guide means for controllably lifting said second web from said second pumping roller to deposit said second web on said core mix layer in a non-tensioned conditon by a draping action.

* * * * *